(No Model.) 6 Sheets—Sheet 1.

C. L. LIBBY.
LATHE HEAD.

No. 455,344. Patented July 7, 1891.

WITNESSES
Wm. J. Tanner
H. J. Tanner

INVENTOR
CHARLES LEON LIBBY
by his atty J. H. Hubbard (No Model.) 6 Sheets—Sheet 3.

C. L. LIBBY.
LATHE HEAD.

No. 455,344. Patented July 7, 1891.

WITNESSES

INVENTOR
CHARLES LEON LIBBY
by his attorney
D. H. Hubbard (No Model.) 6 Sheets—Sheet 5.
C. L. LIBBY.
LATHE HEAD.

No. 455,344. Patented July 7, 1891.

WITNESSES:

INVENTOR:
Charles L. Libby
by J. H. Hubbard, atty (No Model.)  6 Sheets—Sheet 6.

C. L. LIBBY.
LATHE HEAD.

No. 455,344.  Patented July 7, 1891.

WITNESSES:
A. J. Tanner.
W. C. Hinchcliffe.

INVENTOR:
Charles L. Libby
by J. H. Hubbard
attorney

UNITED STATES PATENT OFFICE.

CHARLES LEON LIBBY, OF BRIDGEPORT, CONNECTICUT, ASSIGNOR TO EDWARD P. BULLARD, OF SAME PLACE.

LATHE-HEAD.

SPECIFICATION forming part of Letters Patent No. 455,344, dated July 7, 1891.

Application filed December 9, 1890. Serial No. 374,028. (No model.)

*To all whom it may concern:*

Be it known that I, CHARLES LEON LIBBY, a citizen of the United States, residing at Bridgeport, in the county of Fairfield and State of Connecticut, have invented certain new and useful Improvements in Lathe-Heads; and I do hereby declare the following to be a full, clear, and exact description of the invention, such as will enable others skilled in the art to which it appertains to make and use the same.

This invention relates to certain new and useful improvements in lathes, but more particularly does it appertain to mechanism whereby the spindle may be caused to rotate at different velocities without either shifting the belt or changing the driving-speed thereof.

The object of my invention is to furnish a simple system of gearing, whereby the spindle may be driven direct from the cone-pulley or may be driven at a speed of one to eight of said pulley, or one to sixteen of said pulley, and which may be changed from one speed to another without manipulation of the belt or stopping the lathe. I have mentioned the speeds as one to eight and one to sixteen because they are convenient in practice, and the machine herein shown and described is calculated for them, but other speeds may readily be obtained, if desired, by altering the proportion of the gears.

With the ends just described in view my invention consists in the construction and combination of elements hereinafter fully explained, and then recited in the claims.

In order that those skilled in the art to which my invention appertains may fully understand its construction and method of operation, I will describe the same in detail, reference being had to the accompanying drawings, which form a part of this specification, and in which—

Figure 1:
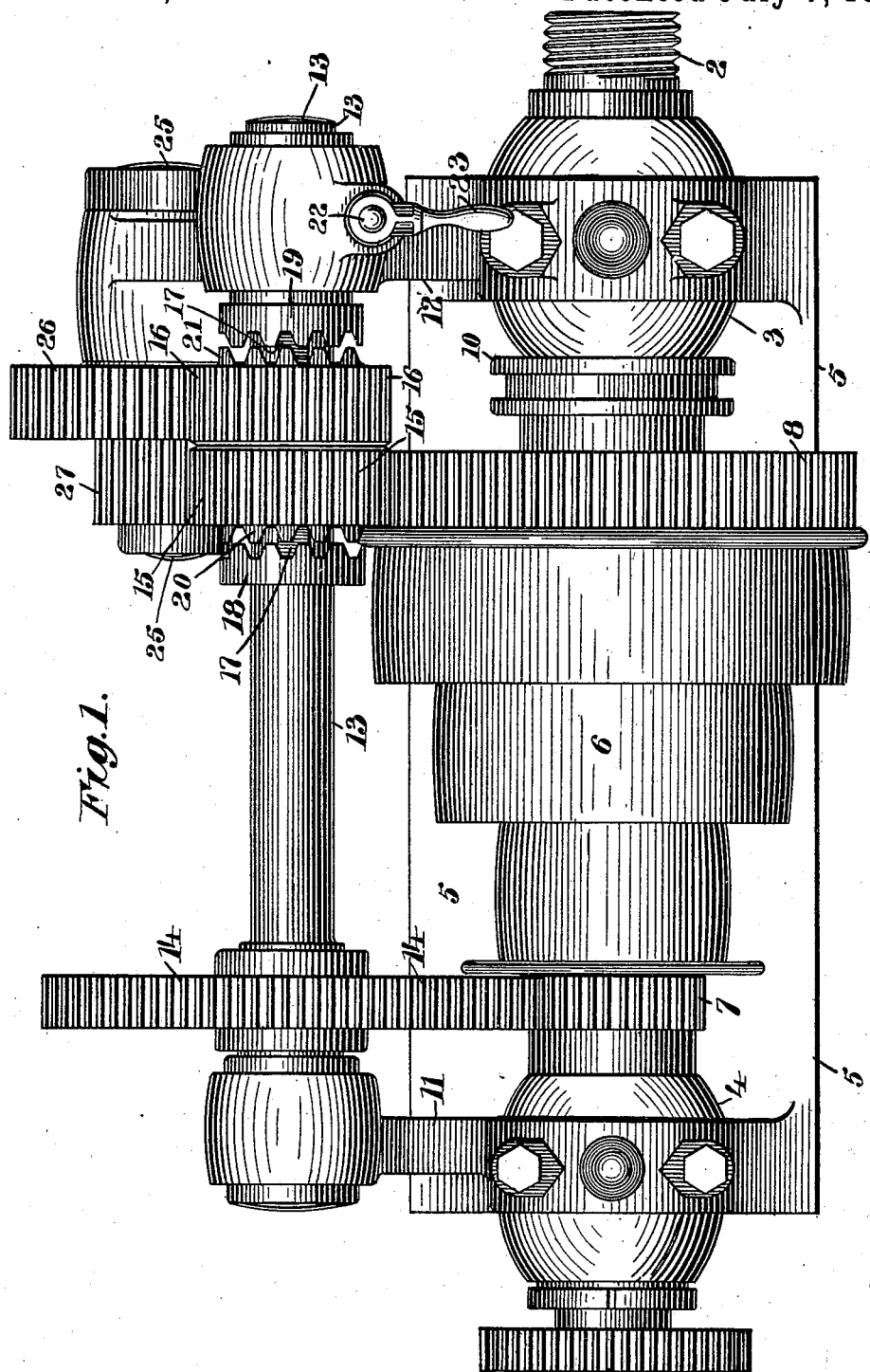
Figure 2:
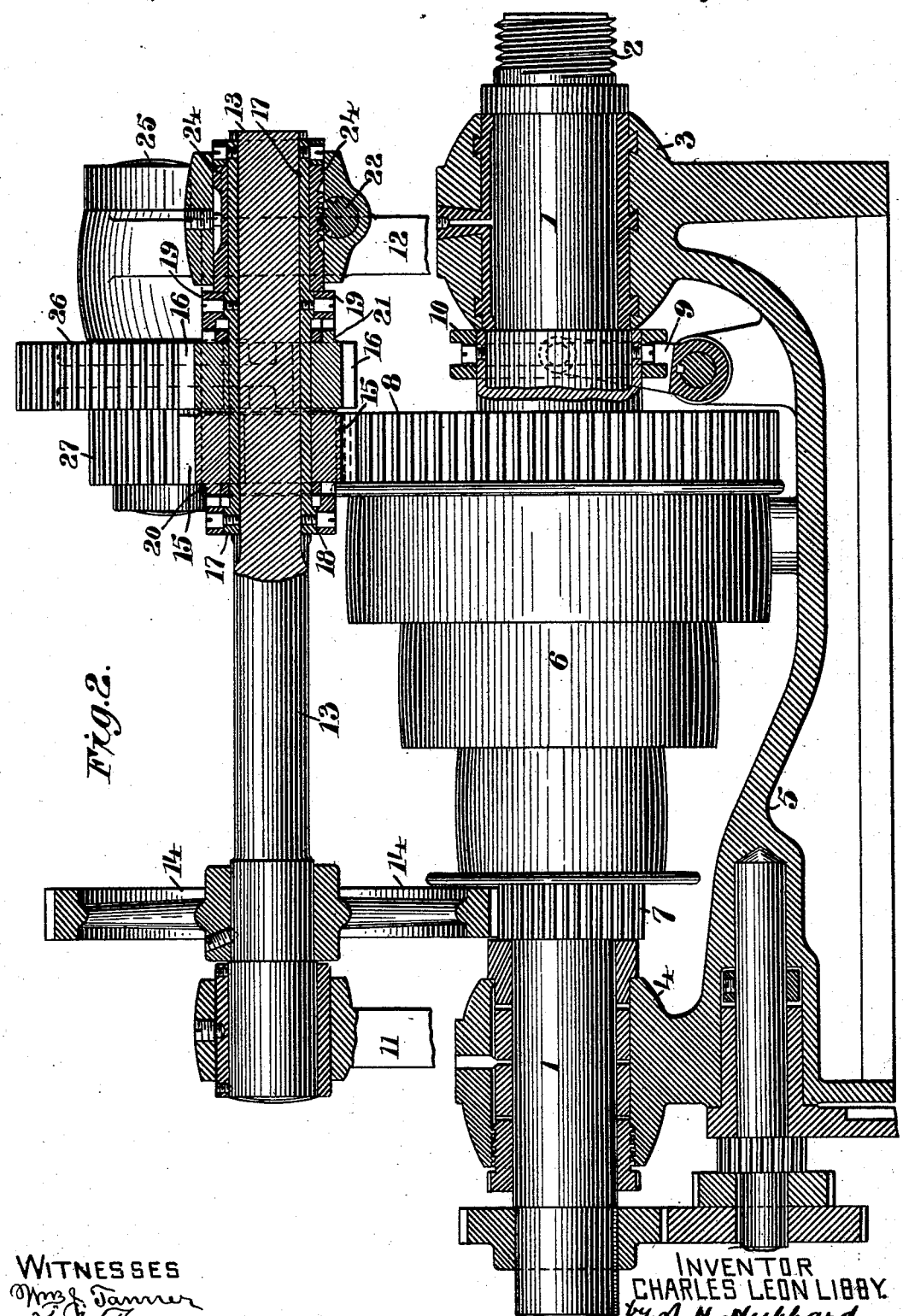
Figure 3:
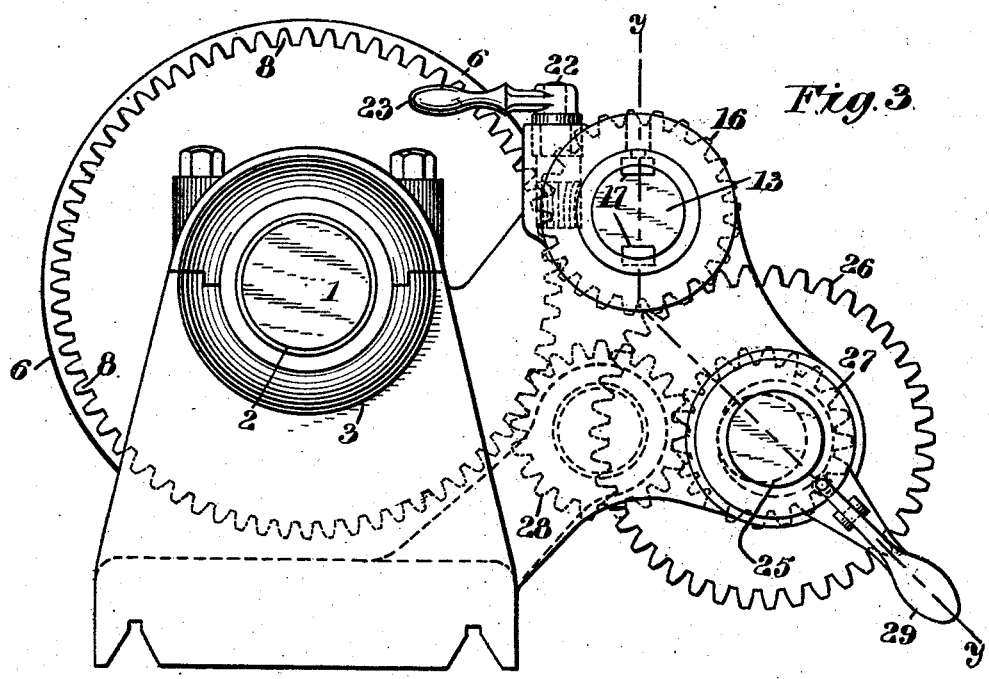
Figure 4:
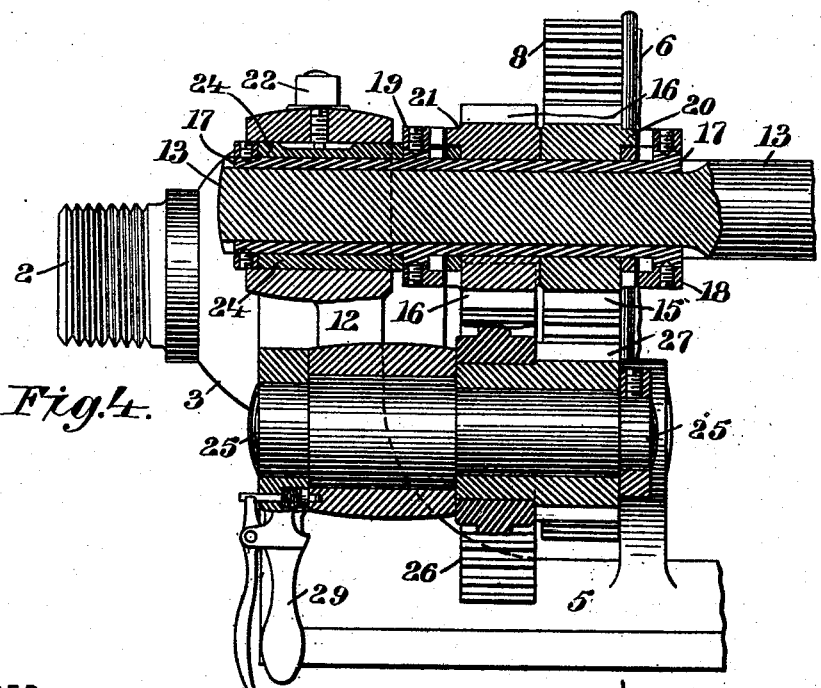
Figure 5:
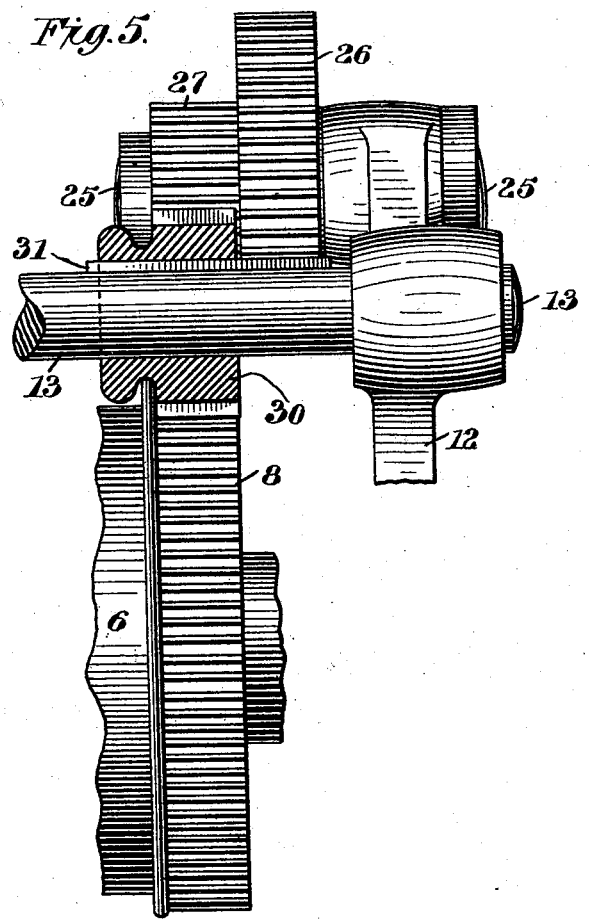
Figure 6:
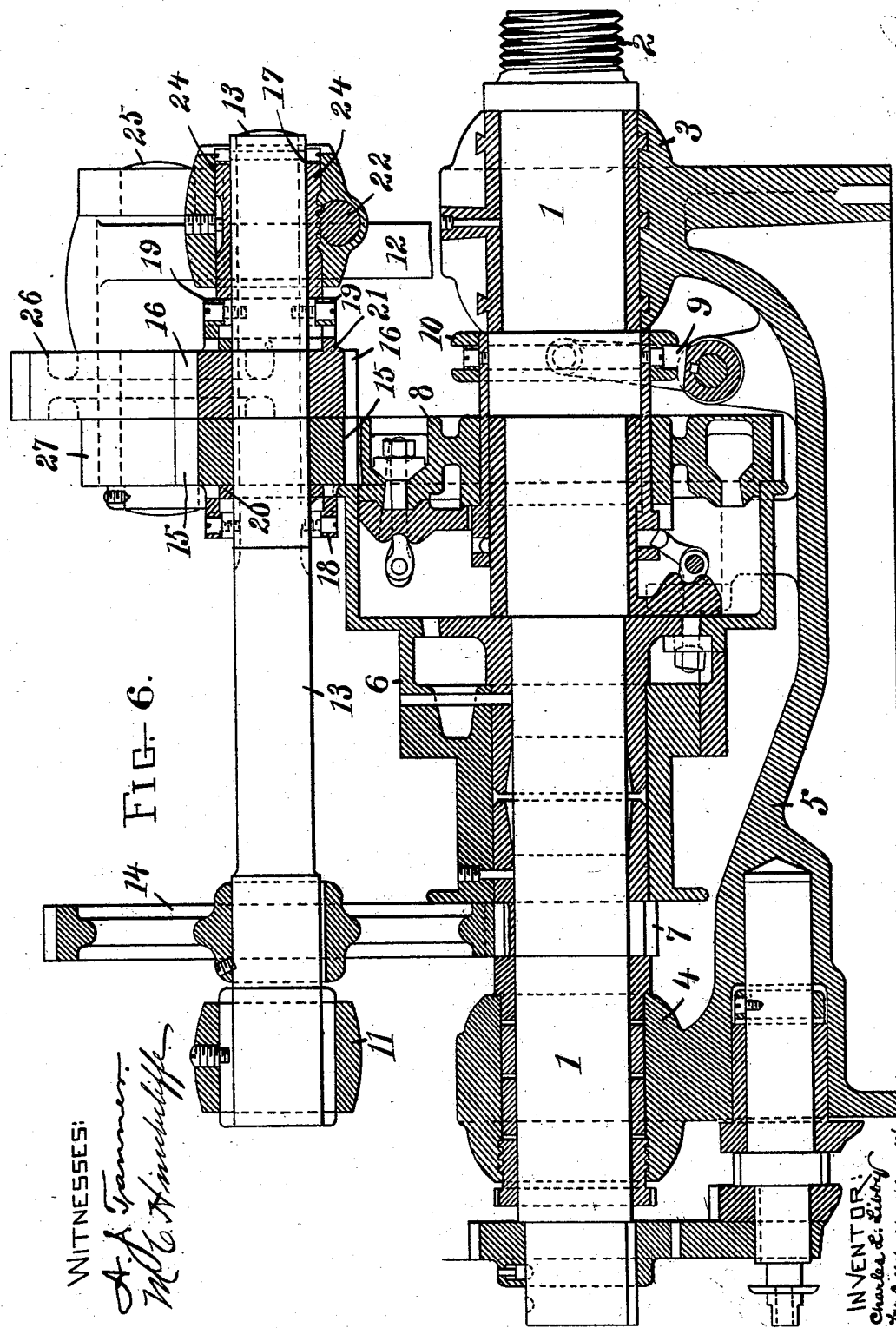
Figure 7:
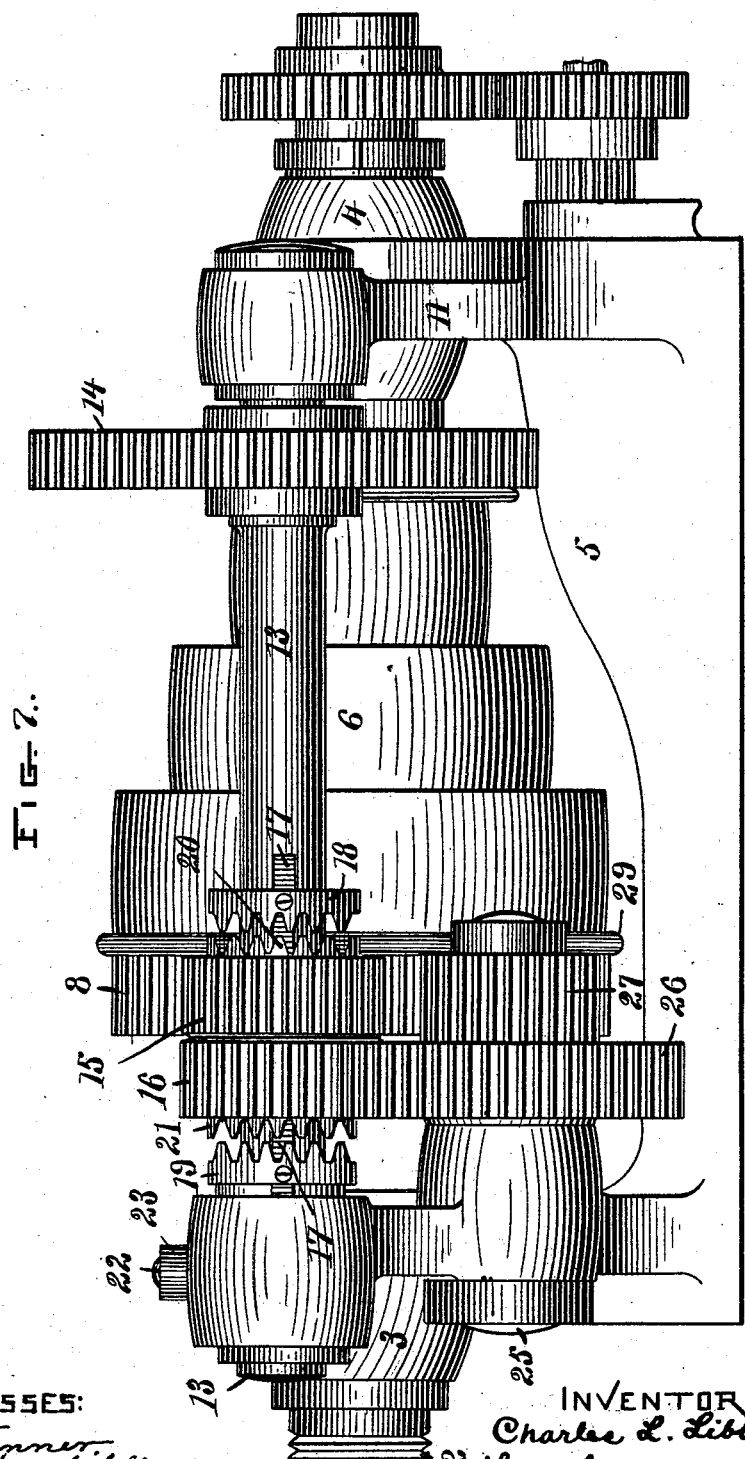

Figure 1 represents a plan view of a lathe-head constructed and adapted to operate in accordance with my invention; Fig. 2, a partial horizontal section; Fig. 3, an end elevation, looking from the right of Fig. 1; Fig. 4, a section taken at the line *y y* of Fig. 3; Fig. 5, a detail front elevation showing a modified construction; Fig. 6, a longitudinal section, and Fig. 7 an elevation looking from the right hand of Fig. 3.

Like numerals denote the same parts in all the figures.

The spindle 1, upon whose threaded end 2 the chuck is adapted to be secured, is supported near its ends in bearings 3 and 4, which are mounted upon the base or frame of the machine 5. 6 is a cone-pulley journaled upon said spindle, and 7 is a gear secured to the end of said pulley and adapted to revolve therewith. At the larger end of the cone-pulley a gear 8 of considerable size is independently journaled upon the spindle 1.

9 is a clutch-operating lever and yoke engaging a longitudinally-movable sleeve 10, which is arranged around the spindle 1. Upon the inside of the cone-pulley this sleeve 10 engages and operates a clutch mechanism, by means of which either the spindle 1 and the cone-pulley 6 may be secured together or the gear 8 and the spindle 1 may be secured together. This clutch may be of any ordinary or usual construction—that is, it may be either a simple key-clutch or a clutch substantially like that hereinafter to be described, or a friction-clutch. This construction is immaterial and forms no part of my invention, and although it is fully shown at Fig. 6 I have deemed it unnecessary to enter into any detailed description of it, since it is the same friction-clutch mechanism which is shown in Letters Patent to William S. Halsey, No. 365,681, dated June 27, 1887.

Projecting rearwardly from the base are brackets 11 and 12, having bearings in which a shaft 13 is supported. Near one end this shaft carries a gear 14 of considerable size, which meshes with the gear 7, carried by the cone-pulley. Near its other end it has journaled upon it gears 15 and 16, which are independent and normally loose upon said shaft.

17 represents a clutch-sleeve, which is splined upon the shaft 13 and bears two opposed toothed clutch-rings 18 and 19, counterparts whereof, numbered 20 and 21, are formed respectively upon the gears 15 and 16.

22 is a vertical shaft having a handle 23, said shaft being adapted to rotate in its bearings and provided with teeth cut in its periphery, as shown in Fig. 2. These teeth mesh with the similar teeth upon a non-rotative but longitudinally-movable sleeve 24, by means of which the rotative clutch-sleeve may be operated along the shaft for purposes of engagement or disengagement.

25 is a short shaft below and behind the shaft 13. Said shaft at the rear of the gear 16 carries a gear 26, meshing with said gear 16, and at the rear of the gear 15 said shaft carries a gear 27, which is secured to the gear 26 and does not mesh with the gear 15, but which through an intermediate gear 28, mounted on a stud or short shaft on the bracket, may transmit movement to the large gear 8.

In Fig. 3 there is shown an eccentric and handle 29, which may be used for disengaging the gears 26 and 27 from the gears 16 and 28, but it forms no essential part of my invention, being common in various sorts of back gearing.

The operation of my invention is as follows: Suppose it is required to drive the spindle 1 direct from the cone-pulley at the speed imparted to the latter by the belt. Then by means of the clutch-lever and clutch 9 and 10 the cone-pulley 6 is clutched fast to the spindle 1 and carries it direct. When the parts are thus arranged, the clutch-sleeve 17 should be in the position shown at Fig. 1—that is, entirely out of engagement—and the shaft 13 will be driven idly from the gear 7 through the gear 14. Suppose the speed of one to eight, heretofore referred to, is desired. The position of the clutch-sleeve and clutch-lever 10 9 are reversed, so that the cone-pulley 6 may revolve freely upon the spindle 1, the gear 8 being clutched fast to said spindle. Then the clutch-sleeve on the shaft 13 is moved by means of the handle 23 toward the right of Fig. 1—that is to say, so that the opposed clutch-faces 18 20 will be in engagement. This locks the gear 15 fast to the shaft 13, and the movement of the spindle 1 is then produced by transmission of power, as follows: from the cone-pulley through the gears 7 and 14 to the shaft 13, and thence through the gears 15 and 8 to the spindle 1. This reduces the speed of the spindle to one turn to eight of the cone-pulley. Suppose the speed of one to sixteen is required. In that case the position of the clutch 9 10 is the same as in the last instance. The position of the clutch-sleeve on the shaft 13, however, is reversed, so as to engage the opposed clutch-faces 19 21 and lock the gear 16 fast to the shaft 13. When thus arranged, the power from the cone-pulley is transmitted through gears 7 and 14 to the shaft 13, thence through the gear 16 to the gear 26, thence to the gear 27, which is secured to the gear 26, thence to the gear 28, which meshes with the gear 8. When the parts are in this position, the back gears and their connections revolve idly and it is not necessary to disengage the gears 26 and 27 by means of their eccentric. By this mode of transmission the speed is still further reduced, so that the spindle revolution will be one to sixteen of the cone-pulley.

As will be readily understood, the change between one to eight and one to sixteen is effected by the operation of one clutch-lever only, and this may be performed without stopping the lathe. The change to the direct driving involves only one additional operation—namely, that of the clutch 9 10—which may also be accomplished without stopping the machine. In case the direct-driving clutch shall be operated to bind the cone-pulley and spindle together while the clutch on the shaft 13 is in engagement for either reduction of speed, no harm will result, since the movement which determines the engagement of the cone-pulley and spindle frees the gear 8 from said spindle, and such of the back gears as are in engagement will simply drive said gear 8 idly upon its bearing about the spindle 1.

In Fig. 5 I have shown a modified construction in which, instead of the two normally-loose gears mounted on the shaft 13, I employ a single gear 30, splined to the shaft by means of spline 31 in such manner as to be movable by hand into engagement either with the gear 8, as shown, for the one-to-eight speed, or into engagement with the gear 26 for the one-to-sixteen speed.

This is in my judgment a device equivalent to the two gears and the double clutch in its action; but it is somewhat less rapid in its operation.

I claim—

1. The combination, with the spindle, the cone-pulley, and the back shaft 13, of the gears arranged upon said back shaft, suitable gears with which said last-named gears are adapted to mesh for driving the spindle, and a longitudinally-sliding clutch, whereby either of the back-shaft gears may be secured to the said shaft, substantially as described.

2. In a machine of the character described, the combination, with the spindle, the cone-pulley, and the back shaft geared to said cone-pulley, of two gears 15 16, arranged upon said back shaft and normally disconnected therefrom, a sliding clutch whereby either of said gears may be made fast to the shaft, and suitable connections between each of said gears and the spindle, substantially as set forth.

3. In a machine of the character described, the combination, with the spindle, the cone-pulley journaled upon said spindle, and the gear 8, also journaled upon said spindle, of the back shaft geared to the cone-pulley, the gears 15 16, arranged upon the back shaft, but normally free thereon, a longitudinally-sliding clutch whereby either of said gears may be made fast to the shaft, and gearing, substantially as described, whereby power may be transmitted from either of the gears 15 16 to the gear 8, substantially as set forth.

4. In a machine of the character described, the combination, with the rotative spindle, of the cone-pulley and the large gear journaled thereon, and means, as described, for making either of said parts fast, the back shaft geared to the cone-pulley, the gear 15, loose upon said shaft and meshing with the gear 8, the gear 16, also loose on said shaft and connected indirectly with the gear 8, and a clutch and means for operating the same, whereby either the gear 15 or 16 may be secured on said shaft and the gear 8 driven therefrom, substantially as described.

5. The combination, with the spindle, the shaft 13, and the gear 8, of the reducing-gears at the rear of the back shaft, and means upon the latter for coupling it for operative engagement either directly with the gear 8 or intermediately therewith through the gears behind the back shaft.

In testimony whereof I affix my signature in presence of two witnesses.

CHARLES LEON LIBBY.

Witnesses:
SHERMAN HARTWELL HUBBARD,
M. C. HINCHCLIFFE.